(12) United States Patent
Bonhomme

(10) Patent No.: US 10,183,342 B2
(45) Date of Patent: Jan. 22, 2019

(54) CUTTING TIP

(71) Applicant: DIAGER, Poligny (FR)

(72) Inventor: Olivier Bonhomme, Baverans (FR)

(73) Assignee: DIAGER, Poligny (FR)

( * ) Notice: Subject to any disclaimer, the term of this patent is extended or adjusted under 35 U.S.C. 154(b) by 0 days.

(21) Appl. No.: 14/785,508

(22) PCT Filed: Mar. 17, 2014

(86) PCT No.: PCT/FR2014/050609
§ 371 (c)(1),
(2) Date: Oct. 19, 2015

(87) PCT Pub. No.: WO2014/170568
PCT Pub. Date: Oct. 23, 2014

(65) Prior Publication Data
US 2016/0082524 A1 Mar. 24, 2016

(30) Foreign Application Priority Data
Apr. 19, 2013 (FR) ..................... 13 53601

(51) Int. Cl.
B23B 51/02 (2006.01)
E21B 10/42 (2006.01)
(Continued)

(52) U.S. Cl.
CPC .............. *B23B 51/02* (2013.01); *E21B 10/42* (2013.01); *E21B 10/44* (2013.01); *E21B 10/58* (2013.01);
(Continued)

(58) Field of Classification Search
CPC ............ B23B 51/02; B23B 2200/0423; B23B 2251/02; B23B 2251/46; E21B 10/42;
(Continued)

(56) References Cited

U.S. PATENT DOCUMENTS 4,722,644 A * 2/1988 Scheuch ................. B23B 51/02
408/230
5,078,554 A * 1/1992 Kubota ................... B23B 51/02
408/227
(Continued)

FOREIGN PATENT DOCUMENTS

JP 2005111817 A * 4/2005
WO 0161142 A1 8/2001

OTHER PUBLICATIONS

International Search Report dated May 9, 2014 re: Application No. PCT/FR2014/050609; citing: US 2002/195279 A1 and WO 01/61142 A1.

*Primary Examiner* — Eric A Gates
(74) *Attorney, Agent, or Firm* — Cantor Colburn LLP

(57) ABSTRACT

The invention concerns a cutting tip (6) comprising: a core (10) that extends axially; and at least a first branch (12) and a second branch (14) that extend radially from the core (10), each comprising: a proximal portion (12a, 14a) connected to the core (10), a distal portion (12b, 14b), and a central portion (12c, 14c) connecting the proximal portion (12a, 14a) and the distal portion (12b, 14b); and a cutting edge (12d, 14d) extending at least along the distal portion (12b, 14b) and the central portion (12c, 14c); in which: the distal portion (12b) of the first branch (12) is arranged radially forward relative to the central portion (12c) of the first branch (12); and the central portion (14c) of the second branch (14) is arranged radially forward relative to the distal portion (14b) of the second branch (14).

20 Claims, 3 Drawing Sheets

(51) Int. Cl.
*E21B 10/44* (2006.01)
*E21B 10/58* (2006.01)

(52) U.S. Cl.
CPC ... *B23B 2200/0423* (2013.01); *B23B 2251/02* (2013.01); *B23B 2251/46* (2013.01); *B23B 2251/50* (2013.01); *Y10T 408/909* (2015.01)

(58) Field of Classification Search
CPC ........ E21B 10/44; E21B 10/445; E21B 10/58; Y10T 407/1948; Y10T 408/909; Y10T 408/9095; Y10T 408/9097
See application file for complete search history.

(56) References Cited

U.S. PATENT DOCUMENTS

| | | | |
|---|---|---|---|
| 5,947,659 A * | 9/1999 | Mays | B23B 51/02 408/211 |
| 6,860,344 B2 | 3/2005 | Bise et al. | |
| 7,070,367 B2 * | 7/2006 | Krenzer | B23B 51/02 408/226 |
| 7,354,229 B2 * | 4/2008 | Wakui | B23B 51/02 408/227 |
| 8,734,068 B2 * | 5/2014 | Krieg | B23B 51/02 408/227 |
| 8,960,336 B2 * | 2/2015 | Kersten | B23B 51/02 175/398 |
| 9,346,109 B2 * | 5/2016 | Xu | B23C 5/10 |
| 2002/0195279 A1 | 12/2002 | Bise | |
| 2011/0085868 A1 * | 4/2011 | Harouche | B23B 51/02 408/229 |
| 2016/0130880 A1 * | 5/2016 | Zuern | E21B 10/42 175/421 |

* cited by examiner

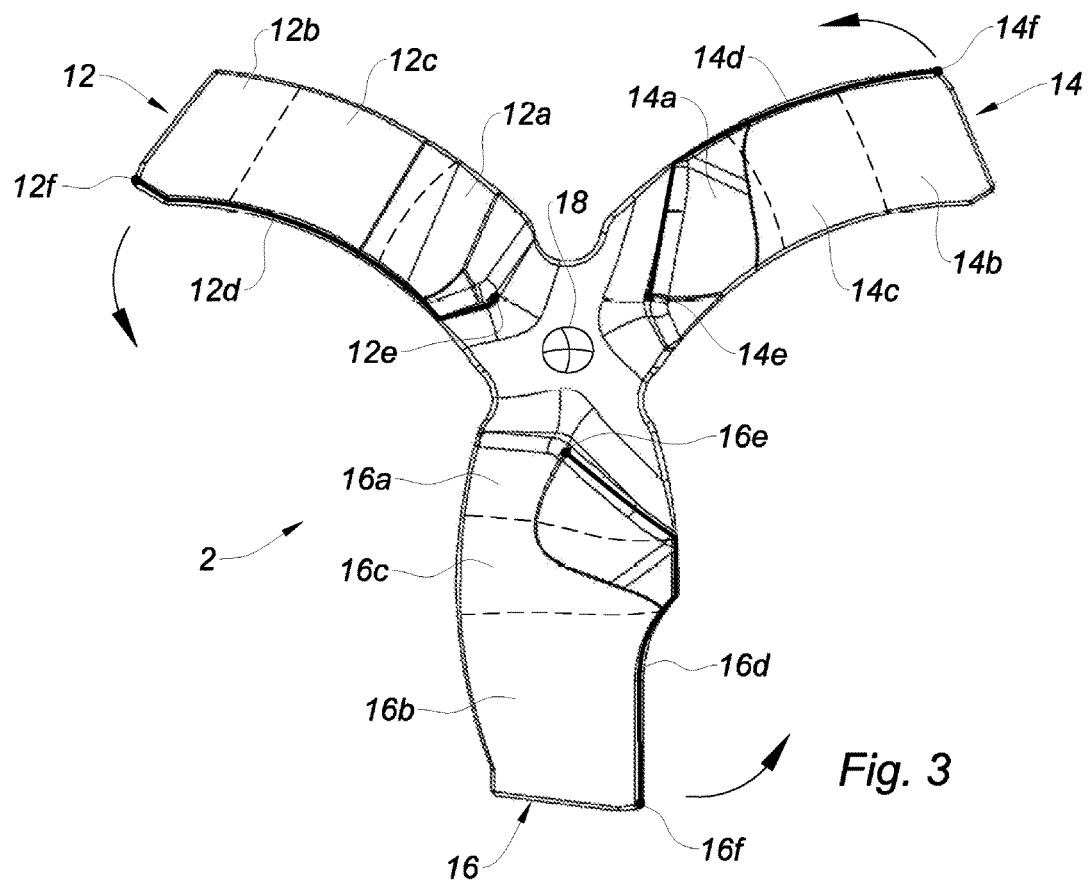
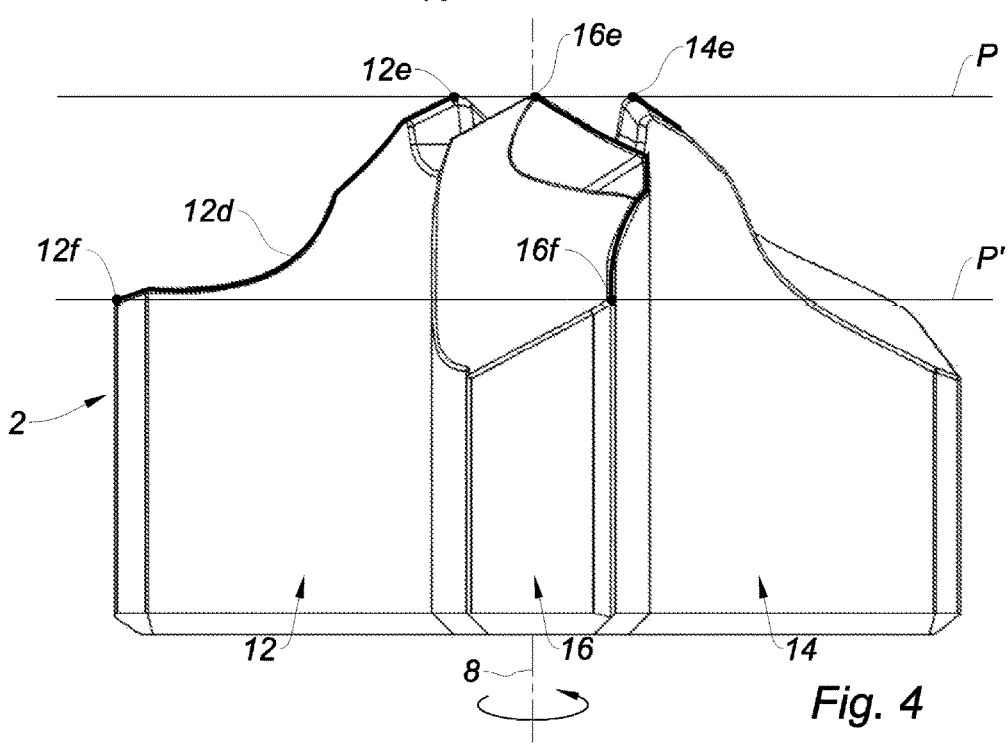

CUTTING TIP

TECHNICAL FIELD

The present invention concerns a cutting insert and a drilling tool.

BACKGROUND

A known cutting insert of the applicant is disclosed in the document U.S. Pat. No. 6,860,344. This cutting insert includes an axially extending core and three identical branches radially extending from the core. The branches are angularly offset by 120°.

Each branch has a proximal portion connected to the core, a distal portion, and a central portion relating the proximal portion and the distal portion.

Each branch has a cutting edge extending on the proximal portion, the distal portion and the central portion.

A drawback of such a cutting insert lies in its low ability to evacuate material chips during the drilling. Also, during a drilling, the material chips tend to accumulate resulting in an increase of frictions exerted on the cutting insert. Therefore, the drilling speed is decreased and the wear of the insert is more important.

BRIEF SUMMARY

The invention aims to overcome this drawback.

The invention concerns a cutting insert designed to be fixed to one end of a tool body in order to be driven in rotation around an axis, including:
  an axially extending core; and
  at least a first branch and a second branch radially extending from the core, the first branch and the second branch comprising each:
    a proximal portion connected to the core, a distal portion, and a central portion connecting the proximal portion and the distal portion; and
    a cutting edge extending at least on the distal portion and the central portion;
  characterized in that:
    the distal portion of the first branch is disposed radially forward with respect to the central portion of the first branch; and
    the central portion of the second branch is disposed radially forward with respect to the distal portion of the second branch.

During a drilling, the movement described by the cutting insert is helical. Thus the movement is a simultaneous combination of a translation and a rotation.

The term "radially forward" refers to the direction of rotation of the cutting insert.

The term "axially forward" refers to the translation direction of the cutting insert.

The distal portion of the first branch is disposed radially forward with respect to the central portion of the first branch.

In other words, in top view, the distal portion of the first branch is disposed forward with respect to the central portion of the first branch, the front referring to the direction of rotation.

Thus, the cutting edge of the first branch allows guiding inwards the material chips in order to be evacuated by the tool body.

The central portion of the second branch is disposed radially forward with respect to the distal portion of the second branch.

In other words, in top view, the central portion of the second branch is disposed forward with respect to the distal portion of the second branch, the front referring to the direction of rotation.

Thus, the cutting edge of the second branch allows guiding inwards the excess of material chips which could not be evacuated by the tool body in order to limit the risk of stemming at the core.

Then, the cutting insert according to the invention allows facilitating the material chips evacuation.

The cutting insert according to the invention may include one or many of the following characteristics.

According to one characteristic, the cutting edge of the first branch has, at least on the distal portion and the central portion, a concave profile; and The cutting edge of the second branch has, at least on the distal portion and the central portion, a convex profile.

In a preferred embodiment, the cutting insert includes at least a third branch comprising:
  a proximal portion connected to the core, a distal portion, and a central portion connecting the proximal portion and the distal portion; and
  a cutting edge extending at least on the distal portion and the central portion.

The increase of the branches number allows improving the cutting insert stability during the drilling.

Advantageously, each cutting edge of the first, second and third branches comprises a leading point disposed axially forward; and The leading points of the first, second and third branches are disposed in the same radial plane.

At the start of the drilling, the leading points of the first, second and third branches rest against the material. The axis of the cutting insert then extends perfectly perpendicular to the material. Thus, the positioning of the cutting insert is facilitated.

Preferably, the leading points of the first, second and third branches are disposed around a recess arranged at one end of the core.

Such recess allows preventing the end of the core, which has a zero rotation speed, from stopping the cutting insert by friction.

Advantageously, the recess has a convex profile.

Thus, during the drilling, the recess bottom guides the material chips toward the outside of the recess. The risk of material chips accumulation and stemming at the end of the core end is limited.

According to an embodiment, the central portion of the third branch is wider than the distal portion of the third branch, so that the cutting edge of the third branch presents a set-back.

The central portion of the third branch which is wider than the distal portion reinforces the third branch and prevents its rupture. The third branch can support more pressure than the first and second branches.

Advantageously, the cutting edge of the third branch is, at least in a part, axially more forward than the cutting edge of the first branch and/or than the cutting edge of the second branch.

Thus, the third branch is arranged to support more pressure than the first branch and/or the second branch.

Preferably, the cutting edge of the third branch has a length lower than the cutting edge of the first and/or of the second branch.

Thus, the third branch supports even more pressure than the first and the second branches. The penetration of the cutting insert is facilitated and the quantity of cut material at each rotation is increased. The drilling speed is therefore improved.

The invention also concerns a drilling tool, such as a drill, characterized in that it includes:
a tool body; and
a cutting insert as represented above, fixed to one end of the tool body.

As an example, the end of the tool body has a slot and the cutting insert is inserted into this slot and brazed.

BRIEF DESCRIPTION OF THE DRAWINGS

The invention will be better understood by the following description, with reference to an annexed schematic drawing representing, as an example, a drill according to the invention.

FIG. 3 is a top view of the cutting insert of FIG. 2;

FIG. 4 is a side view of the cutting insert of FIG. 2; and

Figure 1:
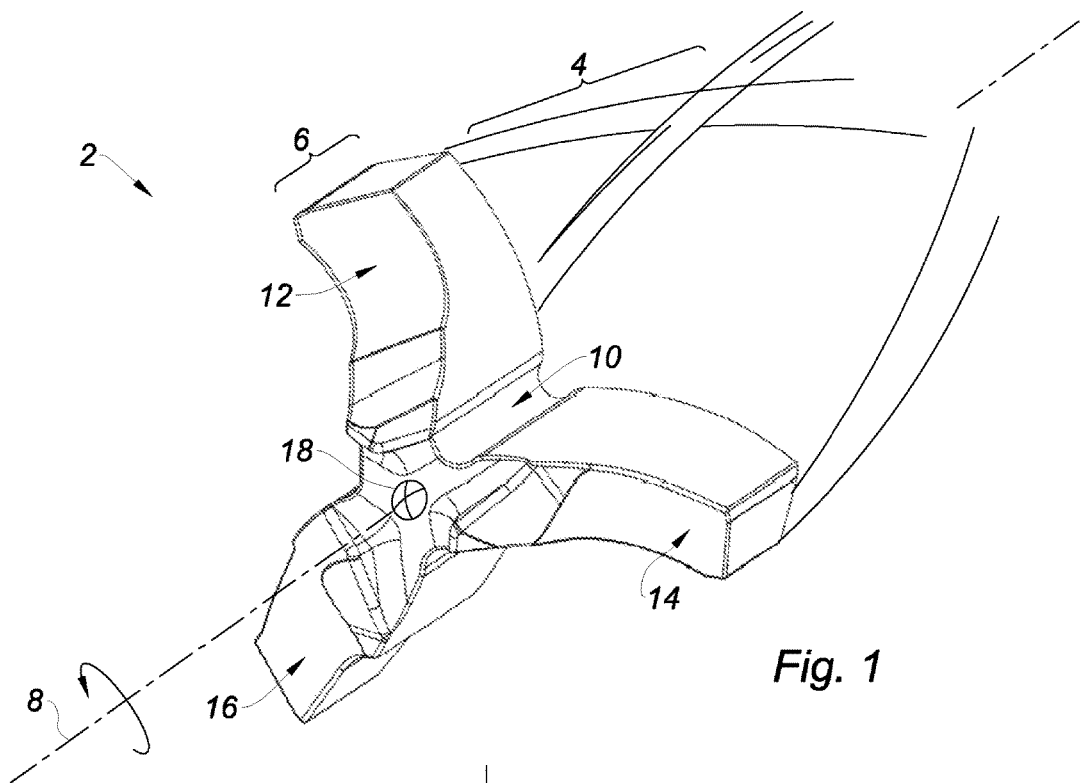
FIG. 1 is a perspective view of a drill according to the invention.

The FIG. 1 represents a drill 2. This drill 2 includes a tool body 4 and a cutting insert 6 fixed to an end of the tool body 4. The tool body 4 and the cutting insert 6 are designed to be driven in rotation around an axis 8.

Figure 2:
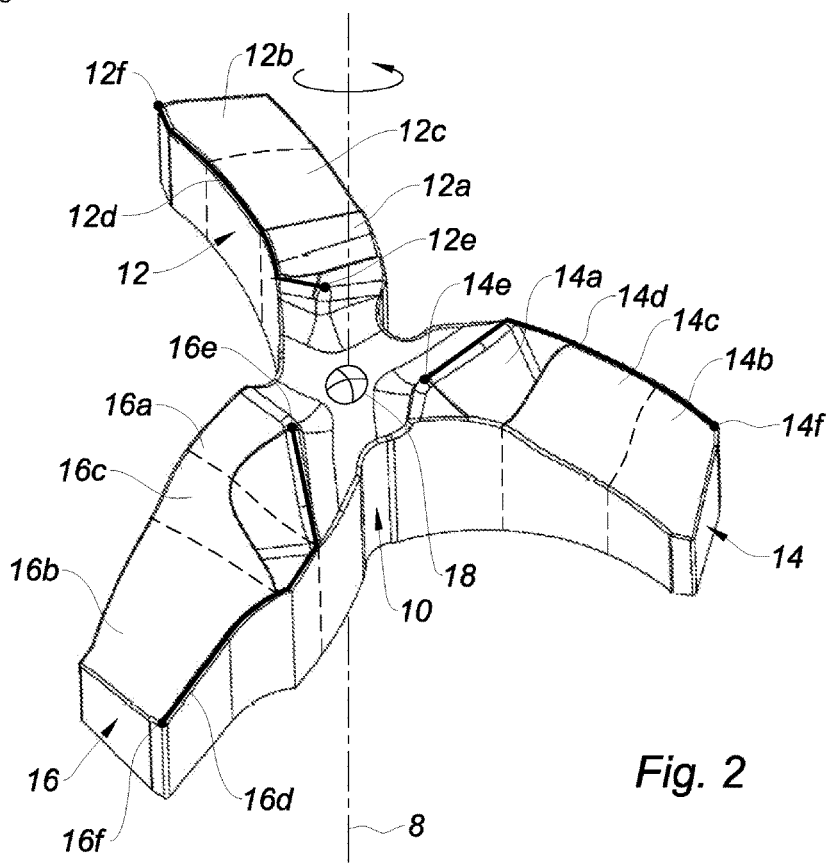
FIG. 2 is a perspective view of a cutting insert equipping the drill of FIG. 1.

The cutting insert 6 (better represented in FIGS. 2 to 4) includes a core 10 extending axially.

The cutting insert 6 includes three branches 12, 14, 16 radially extending from the core 10. The branches 12, 14, 16, are angularly offset by 120°.

Each branch 12, 14, 16 comprises a proximal portion respectively 12a, 14a, 16a connected to the core 10, a distal portion respectively 12b, 14b, 16b and a central portion respectively 12c, 14c, 16c connecting the proximal portion 12a, 14a, 16a and the distal portion 12b, 14b, 16b.

The distal portion 12b of the branch 12 is disposed radially forward with respect to the central portion 12c (as it appears better in FIG. 3). The central portion 14c of the branch 14 is disposed radially forward with respect to the distal portion 14b. The central portion 16c is wider than the distal portion 16b.

Each branch 12, 14, 16 comprises a cutting edge 12d, 14d, 16d extending respectively on the portions 12a, 12b, 12c, 14a, 14b, 14c and 16a, 16b, 16c.

The cutting edge 12d of the branch 12 is a curve and has, on the distal portion 12b and the central portion 12c, a concave profile.

The cutting edge 14d of the branch 14 is a curve and has, on the distal portion 14b and the central portion 14c, a convex profile.

The cutting edge 16d presents a radial set-back.

The cutting edge 16d has a length lower than the cutting edges 12d, 14d.

Each cutting edge 12d, 14d, 16d comprises a leading point respectively 12e, 14e, 16e disposed axially forward. The leading points 12e, 14e, 16e are disposed in the same radial plane P.

Each cutting edge 12d, 14d, 16d comprises trailing points 12f, 14f, 16f, disposed axially backward. The trailing points 12f, 14f, 16f are disposed in the same radial plane P'.

Figure 5:
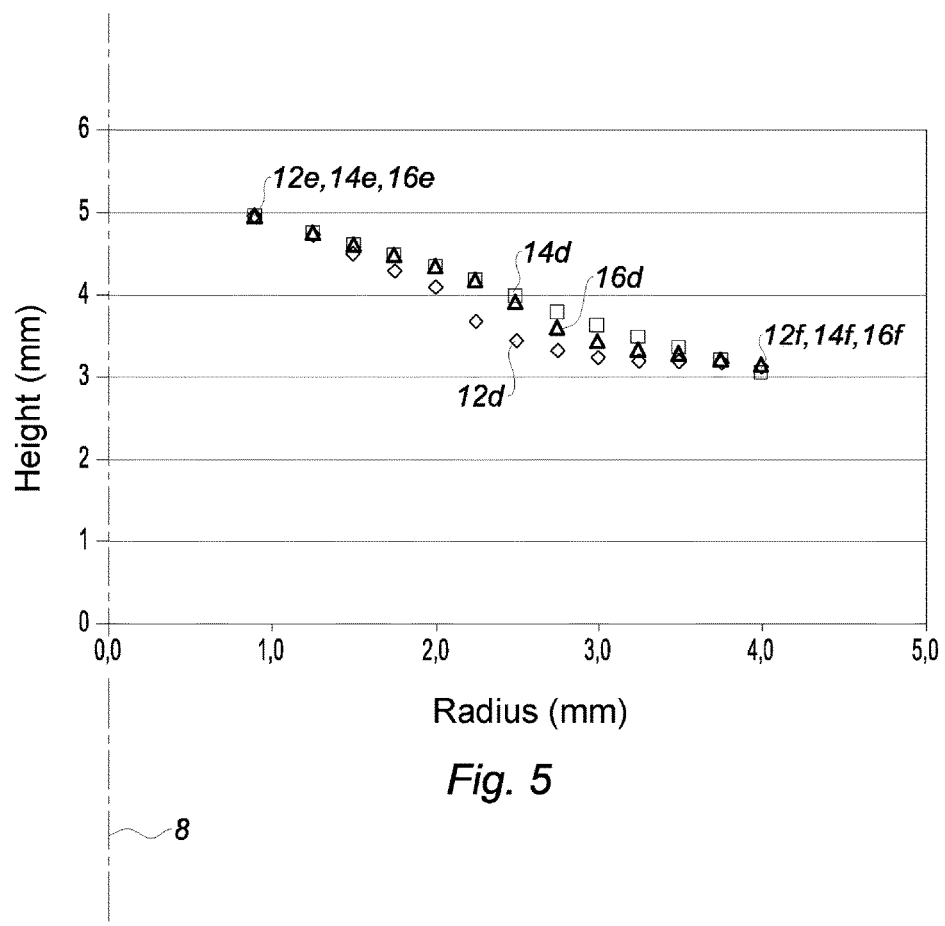
FIG. 5 is a graph representing the axial position of the points constituting the cutting edges of the cutting insert of FIG. 2.

The cutting edges 14d, 16d are axially more forward than the cutting edge 12d between the leading points and the trailing points (as it appears in FIG. 5).

The leading points 12e, 14e, 16e are disposed around a recess 18 arranged at the end of the core 10. The recess 18 has a convex profiled bottom. More specifically, the recess 18 is domed and has a spherical cap shape. The recess 18 is centered on the axis 8.

Obviously, the invention is not limited to the sole embodiment presented above, instead it encompasses all variants.

Thus, in variant, the branches number may be equal to two or even greater than three.

The invention claimed is:

1. A cutting insert designed to be fixed to one end of a tool body in order to be driven in rotation around an axis, including:
    an axially extending core; and
    at least a first branch and a second branch radially extending from the core, the first branch and the second branch comprising each:
        a proximal portion connected to the core, a distal portion, and a central portion connecting the proximal portion and the distal portion; and
        a cutting edge extending on at least the distal portion and the central portion;
    wherein:
    the distal portion of the first branch is disposed radially forward with respect to the central portion of the first branch; and
    the central portion of the second branch is disposed radially forward with respect to the distal portion of the second branch,
    wherein the cutting insert includes at least a third branch comprising:
        a proximal portion connected to the core, a distal portion, and a central portion connecting the proximal portion and the distal portion; and
        a cutting edge extending on at least the distal portion and the central portion,
        the third branch having a different profile from the profile of first and the second branches.

2. The cutting insert according to claim 1, wherein the first branch has, at least on the distal portion and the central portion, a concave profile and the second branch has, at least on the distal portion and the central portion, a convex profile.

3. The cutting insert according to claim 2, wherein the third branch has a profile neither convex nor concave, compared to the profile of the first branch and the profile of the second branch.

4. The cutting insert according to claim 1, wherein the cutting edge of the third branch has a radial setback.

5. The cutting insert according to claim 1, wherein the cutting edge of the third branch has a length lower than the cutting edge of the first branch and/or the cutting edge of the second branch.

6. The cutting insert according to claim 1, wherein the axially extending core is extending along the rotation axis in a straight manner.

7. The cutting insert according to claim 1, wherein each cutting edge of the first, second and third branches comprises a leading point disposed axially forward; and in that the leading points of the first, second and third branches are disposed in the same radial plane.

8. The cutting insert according to claim 1, wherein the leading points of the first, second and third branches are disposed around a recess arranged at one end of the core.

9. The cutting insert according to claim 8, wherein the recess has a convex profiled bottom.

10. The cutting insert according to claim 1, wherein the central portion of the third branch is wider than the distal portion of the third branch, so that the cutting edge of the third branch presents a set-back.

11. The cutting insert according to claim 1, wherein the cutting edge of the third branch has a length lower than the cutting edge of the first branch and/or the cutting edge of the second branch.

12. A cutting insert designed to be fixed to one end of a tool body in order to be driven in rotation around an axis, including:
an axially extending core; and
at least a first branch and a second branch radially extending from the core, the first branch and the second branch comprising each:
a proximal portion connected to the core, a distal portion, and a central portion connecting the proximal portion and the distal portion; and
a cutting edge extending on at least the distal portion and the central portion;
wherein:
the distal portion of the first branch is disposed radially forward with respect to the central portion of the first branch; and
the central portion of the second branch is disposed radially forward with respect to the distal portion of the second branch,
wherein the axially extending core is extending along the rotation axis in a straight manner.

13. The cutting insert according to claim 12, wherein the first branch has, at least on the distal portion and the central portion, a concave profile and the second branch has, at least on the distal portion and the central portion, a convex profile.

14. The cutting insert according to claim 12, wherein the cutting insert includes at least a third branch comprising:
a proximal portion connected to the core, a distal portion, and a central portion connecting the proximal portion and the distal portion; and
a cutting edge extending on at least the distal portion and the central portion,
the third branch having a different profile from the profile of the first and the second branches.

15. The cutting insert according to claim 14, wherein the third branch has a profile neither convex nor concave, compared to the profile of the first branch and the profile of the second branch.

16. The cutting insert according to claim 14, wherein each cutting edge of the first, second and third branches comprises a leading point disposed axially forward;
and in that the leading points of the first, second and third branches are disposed in the same radial plane.

17. The cutting insert according to claim 14, wherein the leading points of the first, second and third branches are disposed around a recess arranged at one end of the core.

18. The cutting insert according to claim 17, wherein the recess has a convex profiled bottom.

19. The cutting insert according to claim 14, wherein the central portion of the third branch is wider than the distal portion of the third branch, so that the cutting edge of the third branch presents a set-back.

20. The cutting insert according to claim 14, wherein the cutting edge of the third branch has a length lower than the cutting edge of the first branch and/or the cutting edge of the second branch.

* * * * *